Patented Jan. 10, 1928.

1,655,726

UNITED STATES PATENT OFFICE.

YOSHITSUGU FUJITA, OF LONG BEACH, CALIFORNIA.

PROCESS OF MAKING PUFFED RICE.

No Drawing.   Application filed December 29, 1926.   Serial No. 157,877.

This invention relates to improvements in a process of making puffed rice cakes, and its objects are to produce rice cakes of this character, which will be extremely palatable, which can be cut or molded without difficulty, which will keep for a long time without deteriorating, and which, when eaten, will crumble and be readily masticated.

The puffed rice which is produced by my improved process is substantially different in character from the ordinary puffed rice which is at present on the market, the puffed rice which I am enabled to produce by my process being more palatable and more nutritious.

In carrying out the steps of my improved process, I take a quantity of rice, say, 100 pounds and wash it until clean. I then take sixty ounces of soda and dissolve it in ten gallons of water, and then soak the clean rice in the solution for ten hours. I then take the rice from the solution and wash it in clean water, and then remove the surplus moisture from the rice. The object of placing the rice in the soda solution is to prevent cracking of the rice when the same is placed in water for a long time, or when it may be placed in water in any of the subsequent steps of the process, or in steaming the rice. After taking the moisture from the rice, I then steam the rice until it is well cooked through the inside thereof. I then prepare a solution consisting of water, 12 gallons, four pounds of common salt, and sixty ounces of soda, and, while the steamed rice is still hot, I place the same in said solution and let it remain until the solution is absorbed which is about fifteen minutes. I then take one gallon of salad oil, and mix the same with the rice. I then steam the rice again. During this step, the rice becomes about double the size which it had after the first steaming. I then dry the rice by placing in sunlight or in any suitable way. I then make puffed rice by roasting the rice in any suitable way, but preferably by placing the dried rice in shallow trays and applying suitable heat. I then make a final solution for the rice, which consists of corn syrup, known in the market as "Karo", and add thereto an equal amount by weight, of sugar, and add some oil, and I then mix this solution with the puffed rice, using about one pound of rice to two pounds of the syrup solution. When thoroughly mixed, I place the rice in shallow molds and cut into cakes of the desired size.

The object of mixing the oil with the rice, is to prevent crumbling of the edges when cutting into cakes.

The rice cakes produced by this process are delicious, palatable, nutritious, will keep for a long time without deteriorating, and will retain their form in packing and handling, are crisp, yet readily crumble when eaten, and are easily masticated.

I claim:

1. The process of making puffed rice, which consists in first washing a quantity of rice, then soaking it in a soda and water solution, for ten hours, then taking the rice from the solution and washing the same in clean water, then taking surplus moisture from the rice, then steaming the rice until thoroughly cooked through, then, while the steamed rice is still hot, placing the same in a solution consisting of water, twelve gallons; soda, sixty ounces; common salt, four pounds, allowing the rice to absorb the solution for about fifteen minutes, then in removing the rice from the solution and mixing it with salad oil, one gallon, then in resteaming the rice, and then in drying the rice.

2. The process of making puffed rice, which consists in first washing a quantity of 100 pounds of rice, then soaking the rice for ten hours in a solution consisting of water, ten gallons, and soda, sixty ounces, then removing the rice from the solution and washing it in clean water, then taking the surplus moisture from the rice, then steaming the rice until thoroughly cooked through, then, while the steamed rice is still hot, placing the same in a solution consisting of water, twelve gallons, salt, four pounds, soda, sixty ounces, allowing the rice to absorb the solution for fifteen minutes, then removing the rice from the solution and mixing it with salad oil, one gallon, then in resteaming the rice, and then in drying the rice in shallow trays.

In testimony whereof, I hereunto affix my signature.

YOSHITSUGU FUJITA.